United States Patent
Polonov

(10) Patent No.: US 11,935,515 B2
(45) Date of Patent: Mar. 19, 2024

(54) GENERATING A SYNTHETIC VOICE USING NEURAL NETWORKS

(71) Applicant: Meca Holdings IP LLC, Lynbrook, NY (US)

(72) Inventor: Claude Polonov, Lynbrook, NY (US)

(*) Notice: Subject to any disclaimer, the term of this patent is extended or adjusted under 35 U.S.C. 154(b) by 149 days.

(21) Appl. No.: 17/563,008

(22) Filed: Dec. 27, 2021

(65) Prior Publication Data

US 2022/0208172 A1    Jun. 30, 2022

Related U.S. Application Data

(60) Provisional application No. 63/216,521, filed on Jun. 29, 2021, provisional application No. 63/170,536, filed on Apr. 4, 2021, provisional application No. 63/130,618, filed on Dec. 25, 2020.

(51) Int. Cl.
| | |
|---|---|
| *G10L 13/06* | (2013.01) |
| *G06N 3/045* | (2023.01) |
| *G10L 13/02* | (2013.01) |
| *G10L 15/02* | (2006.01) |
| *G10L 15/04* | (2013.01) |
| *G10L 21/10* | (2013.01) |

(52) U.S. Cl.
CPC .............. *G10L 13/02* (2013.01); *G06N 3/045* (2023.01); *G10L 15/02* (2013.01); *G10L 15/04* (2013.01); *G10L 21/10* (2013.01); *G10L 2015/025* (2013.01)

(58) Field of Classification Search
CPC ........................................................ G10L 13/06
See application file for complete search history.

(56) References Cited

U.S. PATENT DOCUMENTS

| | | | |
|---|---|---|---|
| 2003/0061051 A1* | 3/2003 | Kondo | G10L 13/06 704/263 |
| 2005/0149330 A1* | 7/2005 | Katae | G10L 13/06 704/267 |

FOREIGN PATENT DOCUMENTS

| | | | |
|---|---|---|---|
| CN | 113393828 A | * | 9/2021 |
| JP | 2000122683 A | * | 4/2000 |

OTHER PUBLICATIONS

Li, H., Kang, Y. and Wang, Z., 2018. EMPHASIS: An emotional phoneme-based acoustic model for speech synthesis system. arXiv preprint arXiv:1806.09276. (Year: 2018).*

* cited by examiner

*Primary Examiner* — Shreyans A Patel

(57) ABSTRACT

A method of generating a synthetic voice by capturing audio data, cutting it into discrete phoneme and pitch segments, forming superior phoneme and pitch segments by averaging segments having similar phoneme, pitch, and other sound qualities, and training neural networks to correctly concatenate the segments.

20 Claims, 9 Drawing Sheets

GENERATING A SYNTHETIC VOICE USING NEURAL NETWORKS

PRIORITY CLAIM

This non-provisional application claims the priority benefits of U.S. provisional application No. 63/130,618, filed Dec. 25, 2020, U.S. provisional application No. 63/170,536, filed Apr. 4, 2021, and U.S. provisional application 63/216,521, filed Jun. 29, 2021, all of which are incorporated herein in their entirety as if restated in full.

BACKGROUND

Text-to-speech based applications enable for the generation of speech based on a script, in which the script is essential read-out-load by a computer. Such speech generation was poor because the sounds of speech were derived largely from sound clip databases, with the sound clips being whole words or parts of words. The result was an unnatural concatenation of sound clips which did not fit together in a natural way, since they were derived from separate recordings. Improving upon this technology are speech-generation applications in which speech is generated using neural networks and deep learning. While these methods increased the naturalness of the generated speech, they are ultimately inadequate because the concatenated sounds are merely smooth in respect to the preceding and following sounds, but mere smoothness in sonic properties can also sound artificial and devoid of normal human emotion. What is needed is a way to more deeply engage with the source material used in training the neural networks, improve the sound database and better organize the sound database by considering overlooked sound elements, and better configure the neural networks to distinguish and concatenate sounds to access the natural dynamic qualities of the human voice.

SUMMARY

Described herein is a method of generating a synthetic voice. First, audio data must be captured and saved as speech segments for pre-processing. Pre-processing includes converting the speech segments so that they share a common audio format. The speech segments should be cut so that the speech segments have a similar or identical segment length. Any given speech segment might be cut into many smaller speech segments. The speech segments should be organized into folders such that each folder only has speech segments from a common speaker.

Second, the phonemes within the speech segments must be identified using a phoneme processor and clipped in order to isolate each separate phoneme within each speech segments. The segments are then further organized into sub-folders such that all the segments in any given sub-folder isolate the same phoneme.

Third, the segments are similarly processed according to pitch type, with a pitch processor configured to identifying the pitch types, and then the segments are organized into further sub-folders such that all the segments in any given sub-folder isolate the same pitch and phoneme.

Fourth, the segments are converted into spectral segments using a Mel-Spectrogram. SPL analysis is performed on the segments in order to quantify various sound attributes. The segments are similarly organized into sub-folders such that all the segments in any given sub-folder not only isolate the same pitch and phoneme but also share common sound pressure, tone, and pause attributes.

Fifth, the segments and the accompany SPL tracks are entered into a neural vocoder configured to determine if the sound attributes of the segments are of sufficiently within designated or otherwise standard sound attribute ranges, and to cull segments that fail.

Sixth, the segments that pass undergo merging, in which all of the segments that have common pitch, phoneme, sound pressure, tone, and pitch attributes are merged into a single segment. Thus, each merged segment becomes representative of a given type. SPL analysis is performed for these merged segments.

Seventh, the segments are iteratively entered into a neural network configured to compare the merged segments with the prior unmerged segments, determine whether the merged segment is in fact superior to each unmerged segment of the same type, and replace inferior merged segments with superior unmerged segments.

Eighth, a neural vocoder is configured to predict subsequent phonemes by being trained on speech segments which have not been cut according to phonemes and pitch. In this neural vocoder, layers of nodes, with each node corresponding to a given phoneme, are followed and/or preceded by weight layers, with each weight layer signifying a likelihood that a first given phoneme is followed by a given second phoneme. Similarly, layers of pitches, with each node corresponding to a given pitch, are followed and/or preceded by weight layers, with each weight layer signifying a likelihood that a particular phoneme of a first pitch is followed by another phoneme of a second pitch.

DETAILED DESCRIPTION

Generating the Synthetic Voice

Figure 1:
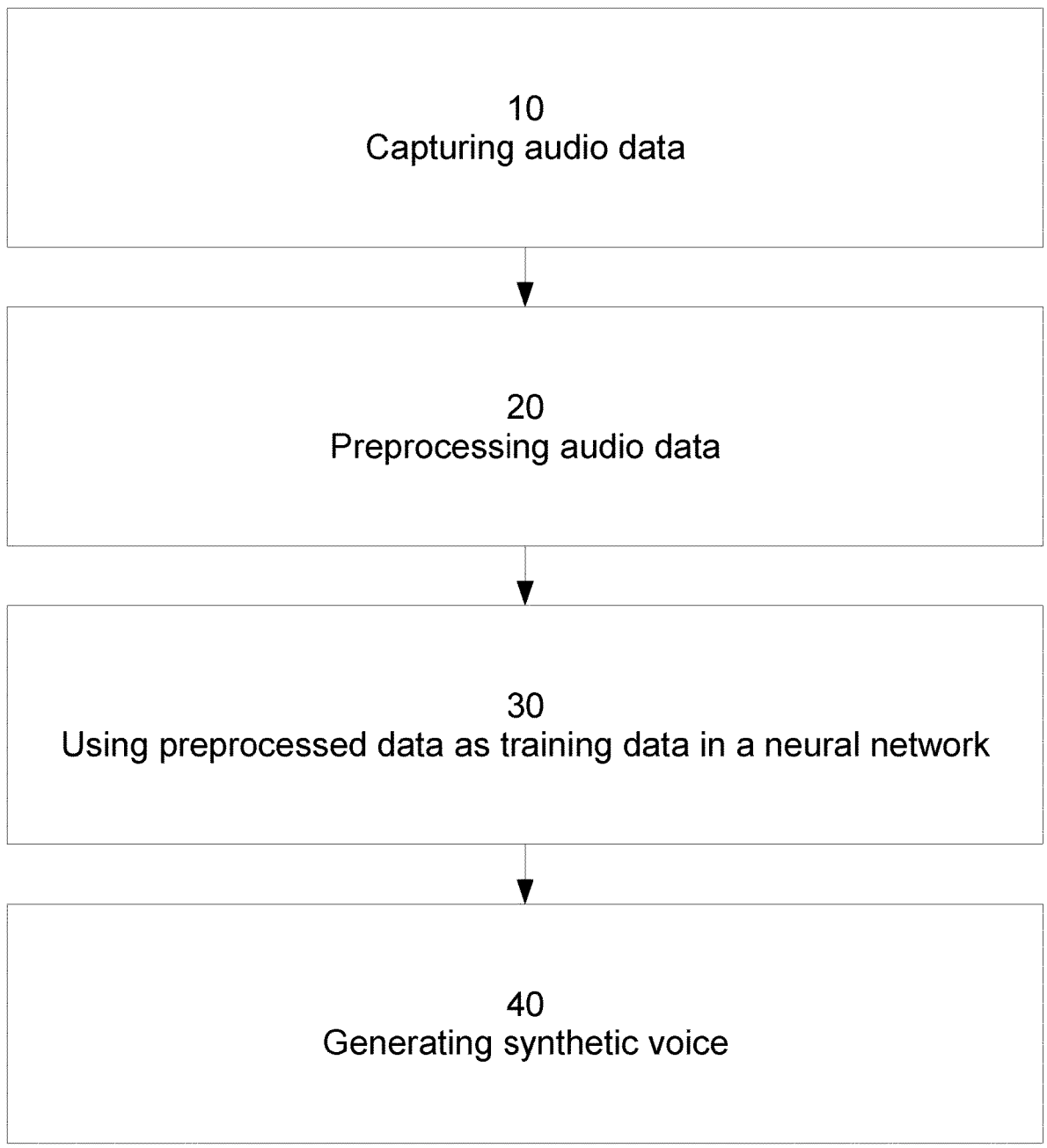
FIG. 1 is a flowchart showing an exemplary process overview of generating a synthetic voice

As shown in FIG. 1, the method disclosed herein may comprise the high-level steps of capturing audio data 10, preprocessing the audio data 20, using the audio data as training data in a neural network 30, and generating a synthetic voice 40. These high-level steps may be further specified as follows.

Figure 2:
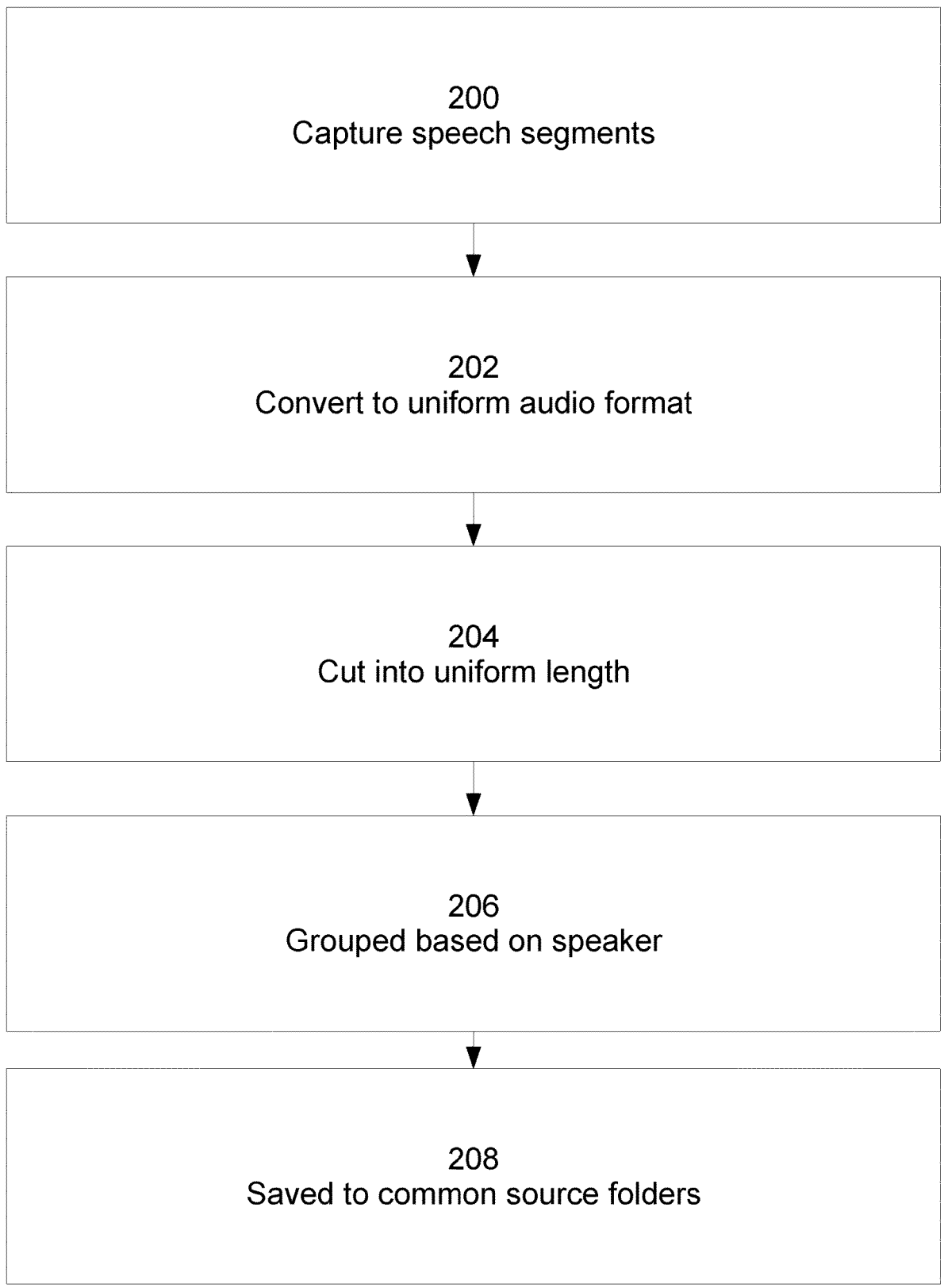
FIG. 2 is a flowchart showing an exemplary process for preparing audio data for phoneme and pitch processing.

As shown in FIG. 2, speech segments are captured 200 and converted to a uniform audio format 202 such as mp3 files. The speech segments may be captured from various online media platforms such as YouTube, Spotify, Podcast, etc., or aggregated from speech segment databases. The speech segment databases may be loaded with voice recordings, preferably from sources varying in the gender, age, educational level, regional accent, and other demographic attributes of the speaker.

The speech segments may be cut into speech segments of uniform length 204, such as thirty second clips. This clipping step may be handled automatically by generic audio manipulation algorithms.

The clipped speech segments may be grouped 206 and saved to "Common Source Folders" 208 based on the speaker, such that all of the speech segments in a given folder are derived from a common source. Each folder may be labeled or tagged in order to preserve the source attribution. Tagging may encompass preservation of the gender, age, educational level, regional accent, and other demographic attributes of the speaker to facilitate concurrent database storage with attribution preservation.

Figure 3:
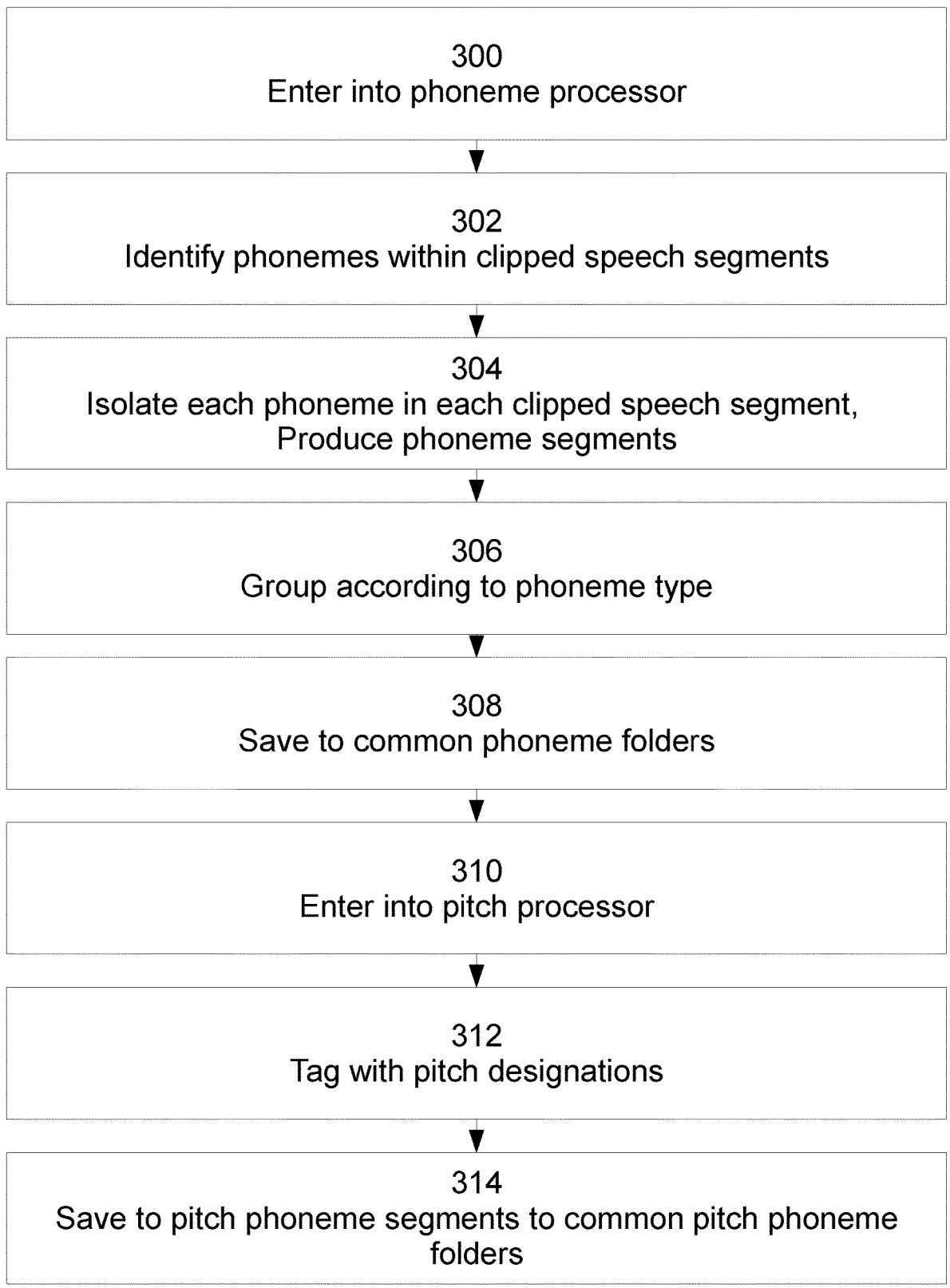
FIG. 3 is a flowchart showing an exemplary process for identifying phonemes and pitches within speech segments, isolating the phonemes within the speech segments, and grouping the segments according to phoneme and pitch type.

As shown in FIG. 3, the folders of clipped speech segments may be entered into a phoneme processor 300, which is configured to identify phonemes within each clipped speech segment 302, and perform additional clipping in order to isolate each phoneme in each clipped speech segment 304 and produce phoneme segments. These phoneme segments may then be grouped according to phoneme type 306 and saved to "Common Phoneme Folders" 308, such that all of the phoneme segments in a given folder share a common phoneme. The identification of phonemes are the grouping of phoneme segments may be accomplished by a grouping algorithm in conjunction with a phoneme dictionary, with the grouping algorithm invoking the phoneme dictionary to accomplish the phoneme identification step. The identification step may involve the utilization of a spectrogram for spectral analysis. In the English language, there are approximately 44 distinct phonemes, so there may be 44 folders.

The phoneme segments may be analyzed and sorted based on pitch and/or pitch changes, with the category of pitch being divided between high, medium, and low pitch, which may each in turn correspond to frequency. The pitch analysis may be performed by a pitch processor 310, tagged with high, medium, or low pitch designations 312, and then saved as pitch-phoneme segments to "Common Pitch-Phoneme Folders" 314, such that all of the phoneme segments in a given folder share a common common pitch and a common phoneme. Since the full range of pitch is being atomized into three distinct pitches, the content of the 44 folders of the preceding step may be distributed across 132 folders. Since pitch could alternately be atomized into 2 distinct pitches, or 5 five pitches (very high, high, medium, low, and very low), the actual number of folders in this step could be 88, or 220 folders, and may be best represented as 44*x, where x is the number of distinct pitches.

Figure 4:
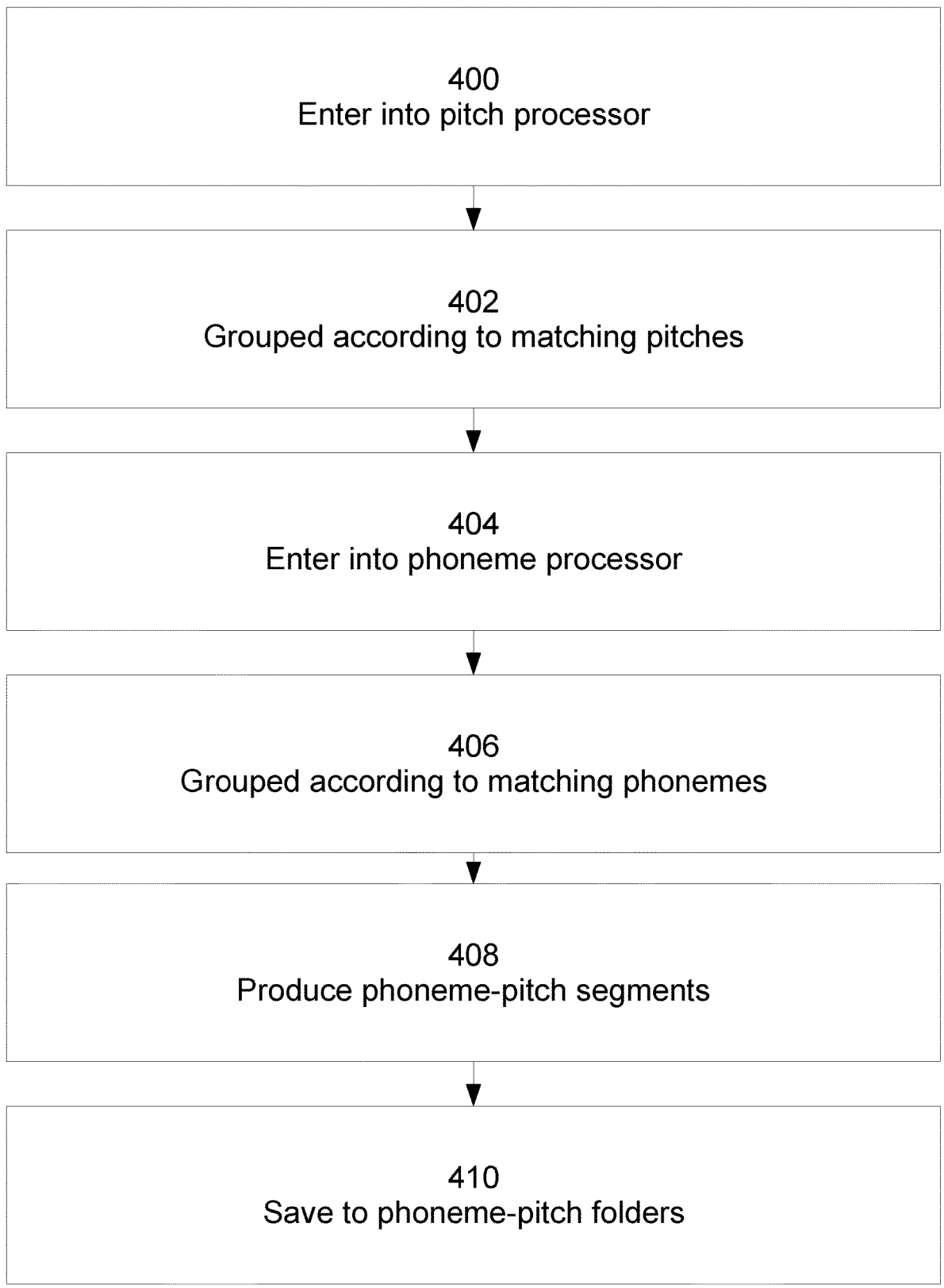
FIG. 4 is a flowchart showing an exemplary alternative of the process described in FIG. 3.

In one variation, as shown in FIG. 4, the clipped speech segments are first entered into a pitch processor 400 and grouped according to matching pitches 402, and then entered into a phoneme processor 404 to be further grouped according to matching phonemes 406, thereby producing phoneme-pitch segments 408 to be saved to phoneme-pitch folders 410.

Figure 5:
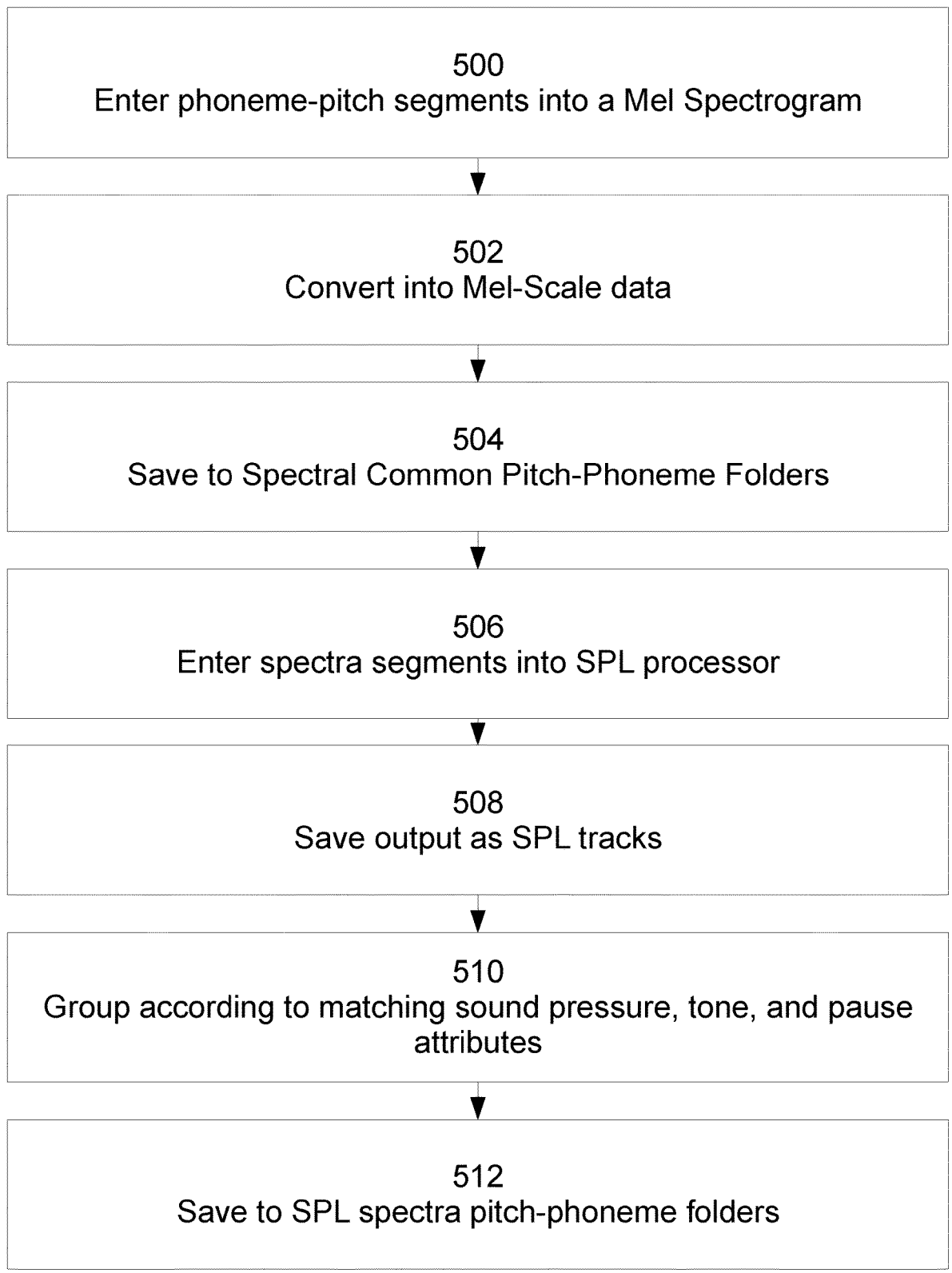
FIG. 5 is a flowchart showing an exemplary process for converting the speech segments into spectral segments and undergoing SPL analysis.

As shown in FIG. 5, the phoneme-pitch segments may be entered into a Mel-Spectrogram 500 in order to convert them from raw audio data into spectral Mel-Scale data 502 and saved to "Spectral Common Pitch-Phoneme Folders" 504. The spectral pitch-phoneme segments ("spectral segments") may be entered into an SPL processor 506 to undergo SPL analysis to identify and quantify the sound pressure, tone, and pause portions, the pause portions being the brief moments between words in which sound is reduced in some fashion, or "paused". The output of this analysis is saved as concurrent SPL tracks 508, each of which correspond to a given spectral segment. The analyzed spectral segments are grouped according to their matching sound pressure, tone, and pause attributes 510, and saved as pre-processed data to "SPL Spectral Pitch-Phoneme Folders" or "Pre-Processed Folders" 512. Even though the number of Pitch-Phoneme Folders is estimated at 132, the number of Pre-Processed Folders may be approximately 2 million.

Figure 6:
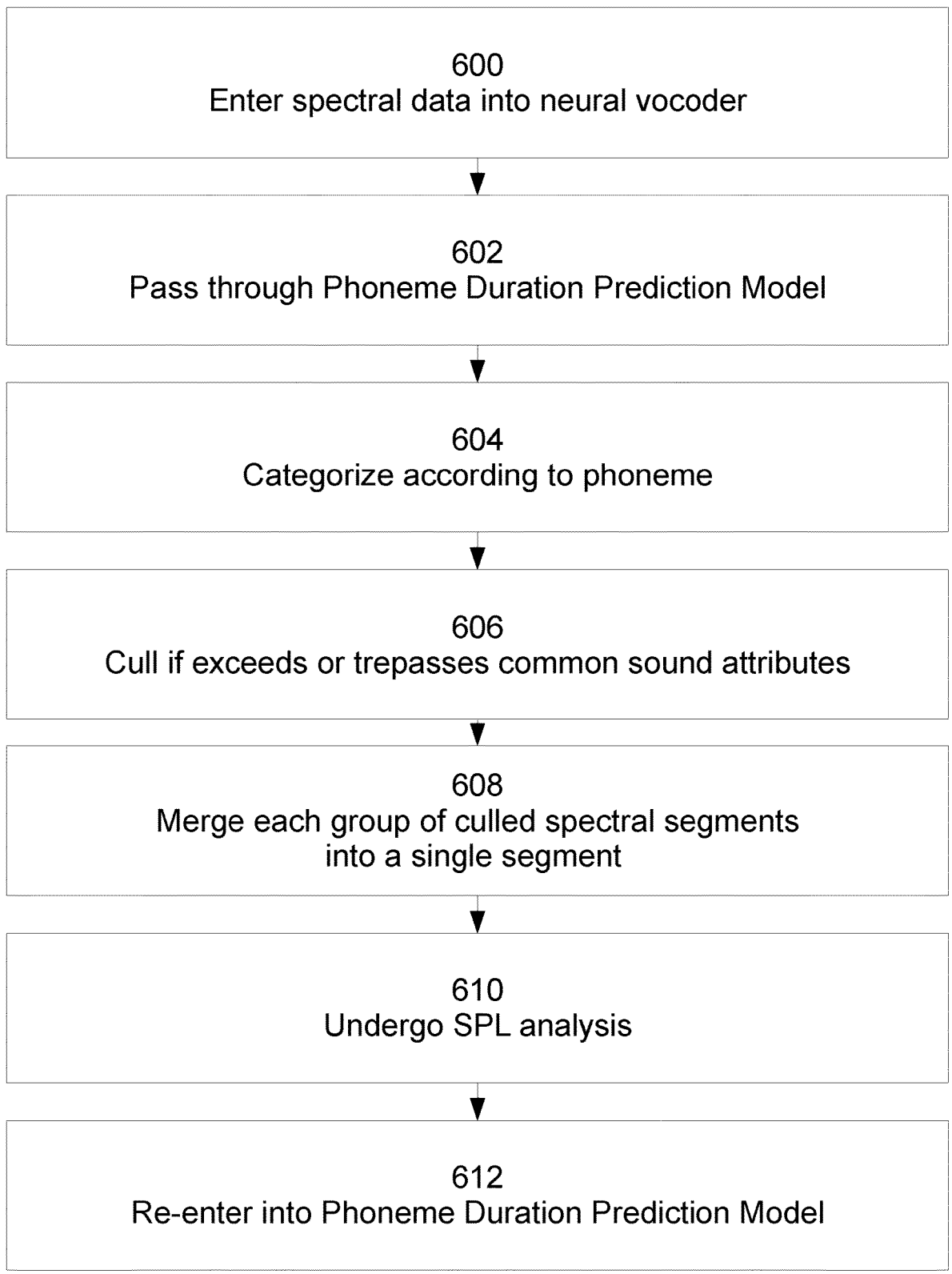
FIG. 6. is a flowchart showing an exemplary process for obtaining superior spectral segments by culling speech segments that are inadequate and then by merging spectral segments sharing phoneme, pitch, and other qualities into a single spectral segment.

As shown in FIG. 6, the pre-processed data, along with corresponding SPL tracks, may be entered into a neural vocoder (the "NV") 600, which is a kind of neural network. The pre-processed data may be entered such that each Pre-Processed Folder operates as a distinct layer. In the first iteration of training, the pre-processed data enters, as it were, a first stream, along with the corresponding SPL track.

The pre-processed data and corresponding SPL track may pass through a portion of the NV constituting the Phoneme Duration Prediction Model 602, which is configured to categorize the pre-processed data according to phoneme 604, which are then culled if the pre-processed data exceeds or trespasses the quantified attributes of pitch and phoneme attribution 606. The attributes of pitch phoneme attribute depend on pitch quality, as will be discussed later. Thus, the Phoneme Duration Prediction Model provides the NV with supervision. The SPL track provides information to the Phoneme Duration Prediction Model that assist in characterizing the corresponding unit of pre-processed data so that the Phoneme Duration Prediction Model uses the appropriate qualitative and comparative analysis rubric.

After the culled, pre-processed data completes a first pass through the Phoneme Duration Prediction Model, it may be considered partially trained data. The spectral segments forming each group of culled spectral segments comprising partially trained data having a common pitch-phoneme type are merged 608 into a single pitch-phoneme spectral segment, such that the merged spectral pitch-phoneme spectral segment is an averaged and representative instance of the pitch-phoneme type and group. The partially trained data is then transmitted through SPL analysis again 610, from which it emerges as SPL-complete partially trained data. The SPL-complete partially trained data is then reentered into the Phone Duration Prediction Model 612, from which it emerges as processed data.

Figure 7:
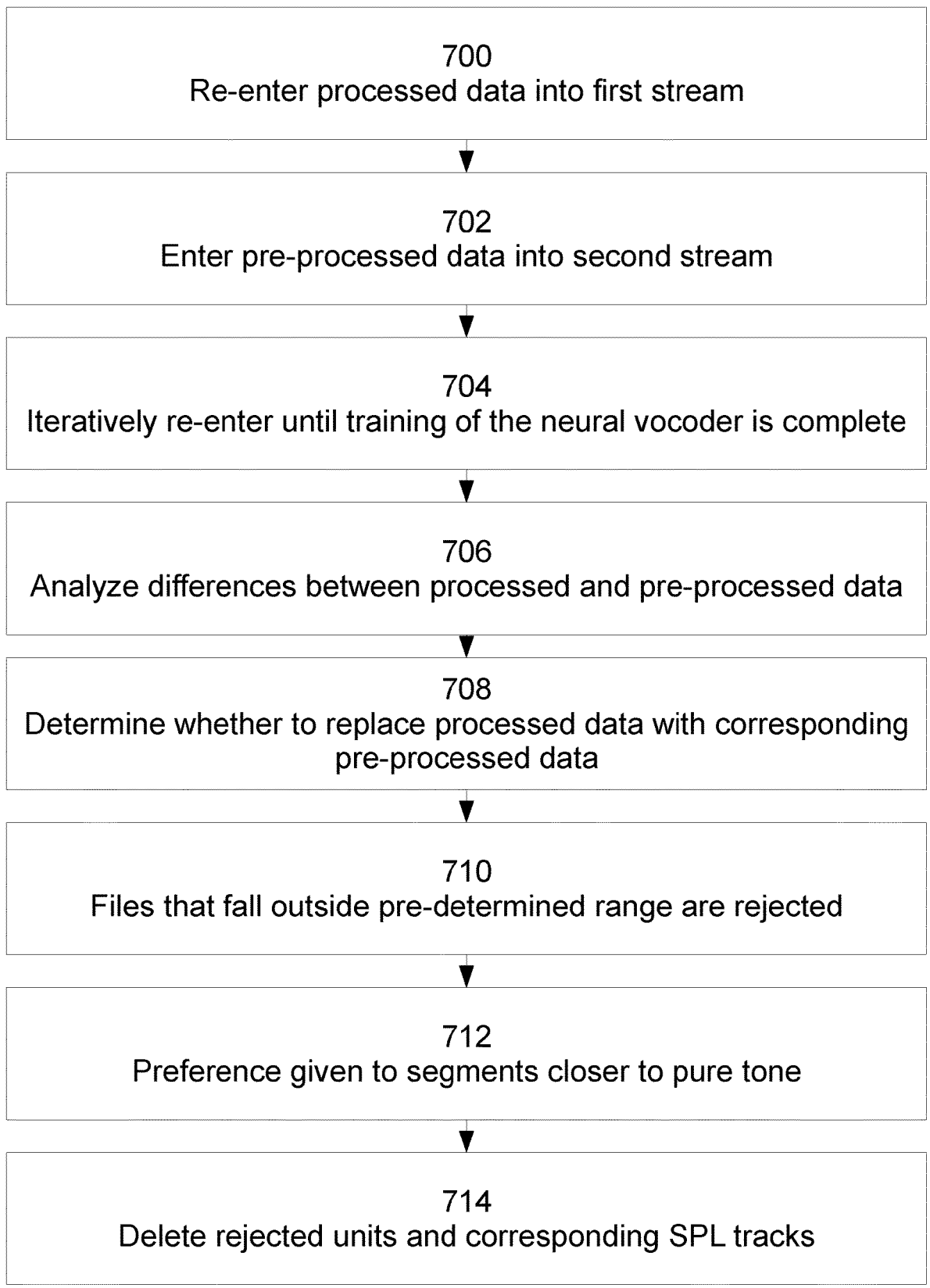
FIG. 7 is a flowchart showing an exemplary process for training a replacing merged spectral segments with original spectral segments when the latter better retain pure tone qualities.

As shown in FIG. 7, this processed data is re-entered into the first stream 700 along with its accompanying SPL track, and the pre-processed data is entered into a second stream 702 with its accompanying SPL track. The output of the second iteration of the NV is still considered processed data, which is iteratively re-entered into the NV 704 until training is considered complete, which may occur in roughly 600 iterations. In each iteration, the differences between the processed data and the pre-processed data are analyzed 706, and the Phoneme Duration Prediction Model selects whether a given unit of processed data (i.e., a single file in a layer) is to be either kept or replaced with its original corresponding unit of pre-processed data 708. This determination is made based on the sound quality of the units, as characterized by pitch, volume, and harmonic content. Segments that fall outside a pre-determined or range of parameters are rejected 710, and preference is given to the segments having a greater proximity to a "pure tone" 712. The rejected unit is deleted along with its corresponding SPL track 714.

Figure 8:
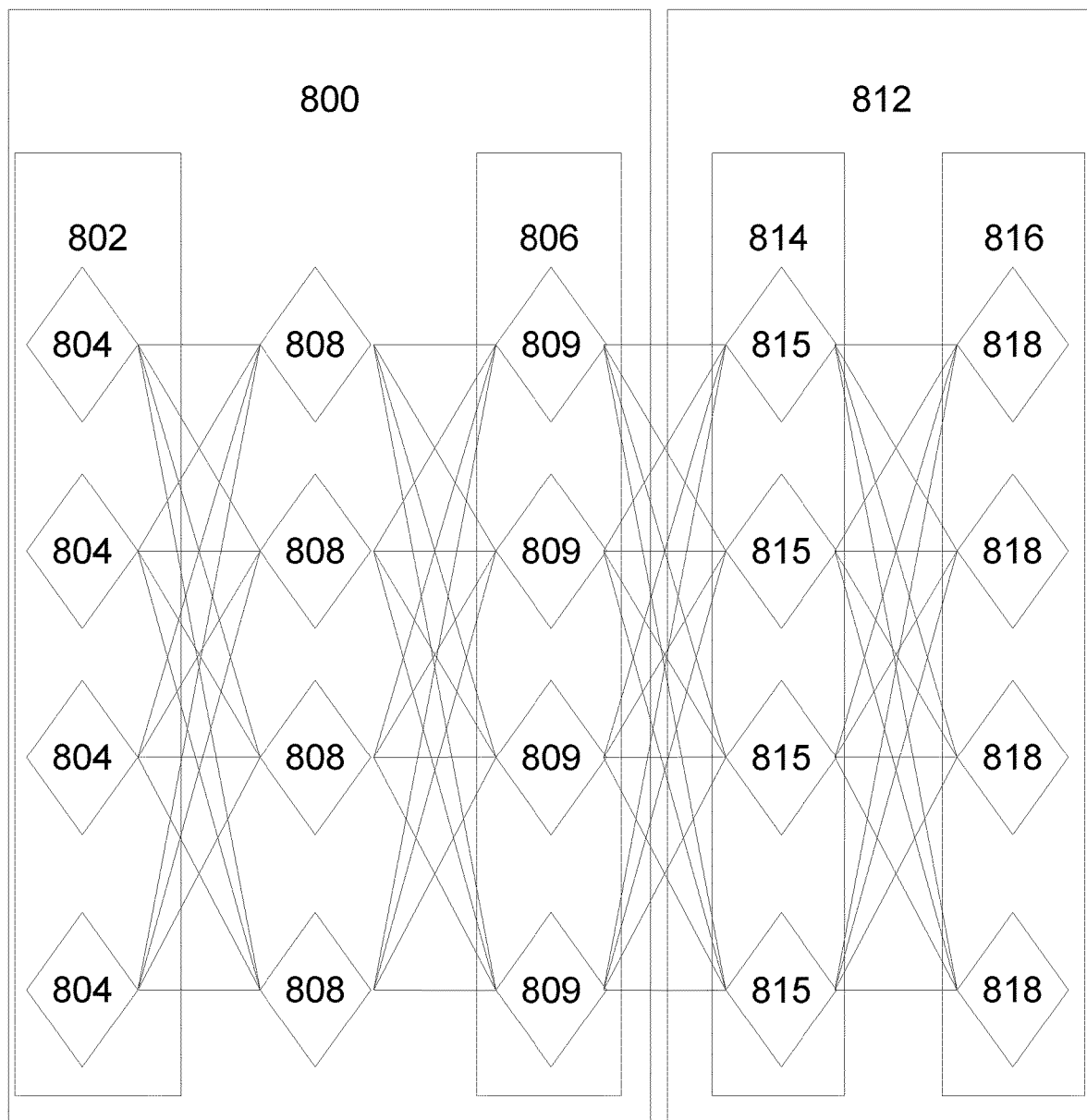
FIG. 8 is a diagram showing exemplary neural network layers and nodes for predicting subsequent pitch and phonemes.

As shown in FIG. 8, in addition to and succeeding the Phoneme Duration Prediction Model, the NV encompasses layers configured to predict subsequent phonemes ("Subsequent Phoneme Prediction Layers") 800, with the input of a prior layer 802 comprising a set of nodes 804 and each node dedicated to a given phoneme as input for a following layer. The following layer 806 also comprises a set of nodes 809, with each node also dedicated to a given phoneme. The nodes of the following layer are each associated with a set of weights 808, with each weight associated with the likelihood that the phoneme associated with the node of the prior layer is succeeded by the phoneme associated with the node of the following layer.

The NV also encompasses layers configured to predict pitch 812. A prior layer 814 of pitches 815 serves as data input for a pitch-weight layer 816. Pitch nodes 818 are weighted according to a range of 0-20, with each pitch node having a pitch-weight. Pitch weights increase incrementally in measurements of half integers (0.5), so there may be 40 pitch nodes in total. These numbers correspond to the pitches of males and female in the mel-scale, with male voices commonly registering in the first thirty pitch nodes, and with female voices partially overlapping the male registers but also registering the remaining ten pitch nodes.

Figure 9:
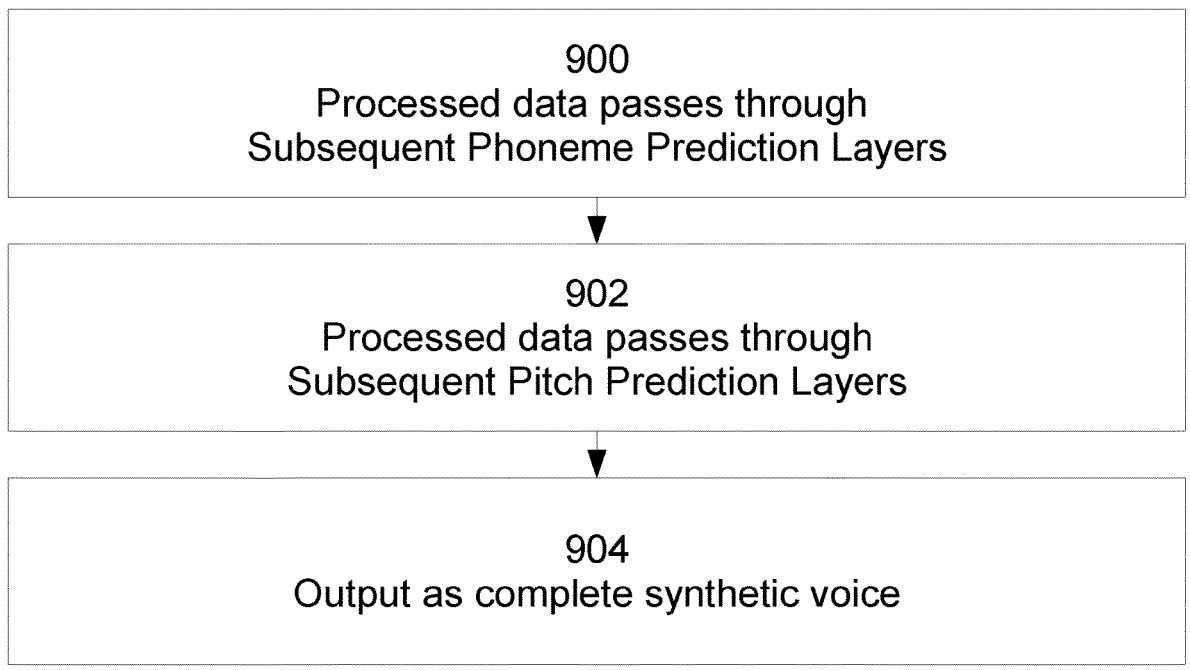
FIG. 9 is a flowchart showing an exemplary process for generating a synthetic voice capable of selecting subsequent phonemes and pitches.

As shown in FIG. 9, the processed data passes through the Subsequent Phoneme Prediction Layers 900 and the Subsequent Pitch Prediction Layers 902. When training is finally complete, the output will be considered "complete data" 904, which remains in the spectral format previously described, but the characteristics of which are that realistic, i.e., natural-sounding speech would be heard of the complete data were converted into audio data. The set of folders containing the complete data in turn constitute a product of NV manufacturing, i.e., a Synthetic Voice which may be indistinguishable from any of the original speech segments in terms of sounding like a recording of a real, natural, human being.

Agent AIs, Central AI

The system described herein may comprise a Pre-Conversation Neural Network, a Post Conversation Neural Network, and a set of Agent Neural Networks. The system may further comprise an administrator portal and a plurality of client portals, with the administrator portal having complete access to all of the neural networks, while the client portals provide limited access to the Post Conversation Neural Network and the Agent Neural Networks.

The system may further comprise a database of episodic memory, a database of semantic memory, and a database of process memory. The memory sectors may be substantially discreet or overlap. They may reside across one or more servers, drives, or disks. They may be located on the cloud or stored locally. They may be accessed directly or indirectly by the Pre-Conversation Neural Network, the Post Conversation Neural Network, and the Agent Neural Networks. Each Neural Network may its own Artificial Intelligence platform, with each platform being hosted on its own dedicated server.

An Agent Neural Network forms part of an Agent AI, which is configured to communicate with customers, patients, consumers, or other recipients of call center communications. The Agent AI participates in a bi-directional audio stream via a web socket (or other full-duplex computer communications protocol)—in particular, by receiving a first audio stream from the web socket, processing the first audio stream, producing a second audio stream, and then transmitting the second audio stream to the web socket for receipt from the customer. The first audio stream may comprise content created, i.e., spoken, by the customer, which is communicated via the web socket to the Agent AI, and the second audio stream may also comprise content created, i.e., synthetically produced, by the Agent AI, which is communicated via the web socket to the customer.

Since the communication is "live", the exchange of audio streams occur in real time, so the receipt of the first audio stream must be processed fragmentally and the second audio stream must also accordingly be produced fragmentally. In between fragments, the audio streams may comprise "dead space", in which no content is communicated or created. Nonetheless, the dead space may still be processed, albeit with reduced processing attention and resources than what could conversely be referred to as "live space", which is made of the content of the first and second audio stream. The first and second audio streams, including live and dead space, are merged into a single "unified audio stream" which may be transmitted by the Agent AI to the Central AI, as will be discussed. The audio streams comprise frequency-time-amplitude data which is processed as will be described below. The audio streams may be converted to text for keyword processing, as well also be described.

The system may include multiple Agent AIs, with each Agent AI having its own ID. The Agent AIs may be grouped together in "Agent Sets", with all of the Agent AIs in an Agent Set being associated with a certain set of tasks or campaign. Each agent may be located on its own Dockerfile, which is a text document that contains all the commands that may be viably actuated via the command line to assemble an image. Docker build enables the execution of several command line instructions in succession. The Agent AIs may also share a Dockerfile if they are designed to satisfy the same purpose or are rented, purchased, and/or controlled by the same client. When a call request is made for a specific campaign or for a specific Agent Set, the Agent AIs associated therewith be activated by the system.

The Central AI is formed at least in part by both the Pre Conversation Neural Network and the Post Conversation Neural Network, and is configured to send and receive data from the Agent AIs, such as the unified audio stream. In particular, the Agent AIs are configured to communicate with the customer using a script provided by the Central AI, but when the customer deviates substantially from the script, the deviation and all related data are relayed from the Agent AIs to the Central AI. The deviation is processed by the Central AI, and the solution may then be a. communicated to the Agent AI for immediate usage, and b. incorporated into the script itself to be used by other AIs in the future.

The script may be initially provided and subsequently added to the Central AI by clients via Client Portal(s). The script received from the clients may be in a text-editing document form, but may be converted into Json/Javascript. The script may generally be modified by the system via the addition of various tags, such as SSML tags.

This feedback provided by the Central AI to the Agent AI ("Central AI Assistance") may be initiated immediately upon and for each deviation, or may be triggered upon the detection of multiple deviations that may be grouped together based on temporal proximity or keyword overlap. A deviation may be detected as such based on a true/false event or series thereof. For example, if the customer asks a question that the Agent AI cannot answer or the only available answer has a low confidence rating, the customer question may be graded as "false". If this event repeats within a given time span, such as fifteen seconds, such that a second question is graded as "false", the system may identify the two questions and the insufficient answers thereto as deviations. Once deviations are detected, the corresponding communications are tagged as such and the tagged communications are saved to a deviation database by the Central AI.

In one version, the Central AI feeds an appropriate response for the deviation(s) to the Agent AIs, who then relay it back to the customer using information obtain during the conversation with the customer. In another version, the Central AI responds directly to the customer using voice parameters that match the Agent AI for that conversation. Generally, the Agent AI makes communication decisions using the script, but the Central AI makes decisions (including learning decisions) based on the context of the communications between the Agent AI and the customer and in a more global modality than the script itself. To this end, the Central AI "listens in" on all communications between Agent AIs and customers, not merely the deviations. The communications as a whole may be permanently saved for future processing and training by the Central AI. Communications of data, including customer conversation communications, may be relayed from the Agent AIs to the Central AIs after first being converted to text via STT (speech-to-text) algorithms.

Multiple Agent AIs may join a given web socket in order to communicate simultaneously with the same customer. In this scenario, the multiple Agent AIs coordinate with each other or are coordinated outside the web socket so as to prevent the two Agent AIs from transmitting audio signals simultaneously through the web socket but instead to take turns. Each of these Agent AIs sharing the same web socket and customer may have different knowledge bases and may rely on different scripts or script segments, such that one Agent AI operates as a manager to which the other Agent AI defers. This deferment may be conveyed to the customer by the other Agent AI explicitly asking questions of the manager Agent AI. In one variation, a second Agent AI may join the web socket after the customer conversation is classified as hostile, based on the detecting of repeated uses of a certain tone, or after an explicit request by the customer to "speak to the manager". Before joining, the second Agent AI may process the communications thus far between the first Agent AI and the customer, including capturing the customer's voice in the form of speech segments, as will be described below.

Episodic memory may be limited to a given conversation between an Agent AI and a customer. Conversation data saved to episodic memory may be saved locally with the Agent AI. After the conversation has ended, the episodic memory may be cleared so that data from the subsequent conversation may be saved to it.

Semantic memory may receive data from the various Agent AIs and for future access by the Central AI. The data saved to semantic memory may be used as semantic training data for the Central AI. The data may comprise words, relationships between words, facts, and ultimately, "opinions" about those facts. Words may be received by customers, and the words may then be sequentially or contextually analyzed to determine word relationships. Based on the word relationships, facts—or statements that may be understood as texted—are deduced, as well as opinions about those facts. These opinions may be derived from the statements and therefore represent customer opinions, or may be developed by the Central AI. These facts and opinions—or statements or questions about them—may be included in the script to be thereafter communicated by the Agent AIs to customers. For example, if a first customer communicates with a first Agent AI about enjoying a particular movie, the words and relationships between them which correspond to the first customer's enjoyment of the movie may be saved to semantic memory, processed by the Central AI, and then transmitted to a second Agent AI who may then discuss enjoying that same movie with a second customer.

Process memory may receive data from the Agent AIs and/or the Central AI, and may receive data and provide access to that data to enable the transmission of instructions (as well as data) to and from the Agent AIs to the Central AI, or for processing by either of them.

Effective memory may work in conjunction with process memory to assist the Central AI in performing various tasks, including retro causal operations.

The method of processing and producing audio streams disclosed herein may comprise the high-level steps of performing speech pattern recognition of customer conversations, executing algorithms configured to perform retrocausal operations to interpret the speech patterns, performing speech warping to modify the AI voice, and performing audio mixing to master the AI voice.

Speech pattern recognition may comprise a set of algorithms configured to extract customer speech patterns contained within the first audio stream. Speech pattern recognition may comprise the steps of receiving an audio stream, converting the audio stream to text via a speech recognition algorithm, detecting tone, speed, pitch, and phonemes and categorizing accordingly using a speech analysis algorithm, and identifying sentiment by categorizing the pitch plus tone groups, and associatively coupling the sentiment with sections of text or keywords by associating the identifies sentiments to the keywords in the text based on their correspondence to the audio stream.

Retrocausality is a process or technique of understanding statements based on the context of those statements, particularly be considering and linking those statements to past statements. Invoking retrocausality here involves executing retrocausal operations on the text and audio streams, and may comprise the steps of parsing based on keywords and the pitch and tone of those keywords, and saving the retrocausality determinations to episodic memory. Retrocausality operations may be performed by the Agent AIs and/or the Central AIs.

Speech warping is a process by which the audio stream generated by the Agent AI, i.e., the voice of the Agent AI, is modified in order to match the tone mimic the speech pattern of the customer. Speech warping herein may comprise the steps of receiving the sentiment data, including speed and pitch information from the first audio stream, and modifying the initial response audio stream in order to create a modified audio stream (the second audio stream) until it possesses the same speech and pitch information as the first audio stream.

Audio mixing of the voice of Agent AIs may include receiving the second audio stream from the speech warping algorithms, and further modifying the frequency-magnitudes so that the frequency-magnitudes conform to or fall within the boundaries of pre-set levels.

Audio Mixing

The system includes a neural style transfer step, which is an audio mixing algorithm that takes sound characteristics of the original voice and transfers them to the synthetic voice by modifying the synthetic voice. Characteristics capable of being transferred include pitch, warmth, brightness, timbre, color, and the presence of overtones, which are secondary tones which occur simultaneously with the primary tone. Bright characteristics are the result of high-pitch overtones—i.e., multiple higher-pitched tones, and the amplification of the higher pitches. Warm characteristics are the result of low-pitch overtones. The lack of brightness may result in a voice sounding overly breathy, dark, and "woofy". A well-balanced voice has both bright and warm qualities, and the presence of both these qualities makes a voice sound not only more natural but also richer. Generally, synthetic voices tend to be monotone, or feature unnatural overtones. By capturing overtone characteristics from the original voice and transferring them to the synthetic voice, the synthetic voice becomes more balanced and natural sounding and pleasing to the listener.

The neural style transfer step consists, first, of comparing the original voice recordings of the pre-processed spectral segments with the synthetic voice of the processed and complete data, both of which are in the form of Mel-Scale data, and aligning them with respect to matching phonemes. Thus, each of the 44*X phonemes of the original voice has a matching phoneme in the synthetic voice, and these matches are aligned for better comparison and calibration of their overtones, as will also be described.

Since pitch is basically a non-scientific term for frequency, and each phoneme consists of frequency overtones, the frequency overtones are detected based on recognizing and isolating the different frequencies detected in the spectrograms of each phoneme. Thus, the spectrogram for each synthetic voice phoneme is projected onto the spectrogram for each original voice phoneme for a comparison of the frequency (overtones). Frequencies in the original voice are matched to frequencies in the synthetic voice such that the crests and troughs of each are approximately equal, by aligning a given crest or trough of a wavelength from the original voice with a given crest or trough of a wavelength from the synthetic voice, and then calibrating the wavelength in the synthetic voice, such that the approximately equal frequency in the synthetic voice is modified so as to correspond even more closely to the matched and aligned frequency in the original voice.

Matches are unlikely to be perfect, and therefore frequencies in the original voice may not be found in the synthetic voice. Therefore, the frequencies of the synthetic voice are modified by a pre-determined variance threshold. A good working variance threshold has been found to be 0.026%. Thus, the time of each given wavelength in the synthetic voice is shortened, or lengthened, by 0.026% until the frequency matches a frequency in the original voice. The matching consists of selecting a common starting point in each wavelength, such as a crest or trough, calculating the frequency based on the reoccurrence of crests/troughs, and then comparing each frequency in the synthetic voice with each frequency in the original voice until a match is found that is within 0.026%. The frequency in the synthetic voice is modified so as to correspond to the matching frequency in the original voice. In this sense, matching and calibration are closely related, if not equivalent.

Matches may also be duplicative, because the synthetic voice may have multiple frequencies being approximately equal to a frequency in the original voice, and conversely, because the synthetic voice may have a frequency which is approximately equal to multiple frequencies in the original voice, based on the variance threshold of 0.026%. When a frequency in the synthetic voice is matched to a frequency in the original voice which was already matched to a different synthetic voice frequency, another match in the original voice may be sought. If no other match is found, the matching synthetic voice frequency may be deleted, since having two matching synthetic voice frequencies calibrated identically creates a doubling of the amplitude of the frequency. Alternatively, the matching synthetic voice frequency is still matched (and calibrated, as described) to the matching original voice frequency, such that the matching original voice frequency now corresponds to two identical calibrated matching synthetic voice frequencies.

The process described above is accomplished, at least in part, by entering the original and synthetic voice as stream inputs of a convolutional neural network, with the variance threshold providing the supervisory functionality. The original voice comprises a first stream and the synthetic voice comprises, at least initially, a second stream thereof. After an initial output of calibration, the output is re-entered into the second stream for further calibration. Thus, calibration is obtained using a supervised convolutional neural network with the output, consisting of the phoneme spectrogram data containing the calibrated frequencies, forming a third voice, dubbed "The Calibrated Synthetic Voice". The Calibrated Synthetic Voice, and more precisely the phonemes that form it, can be entered into the layers of the Pre-Conversational Network that correspond to the predicting of phoneme and pitch relationships i.e., the Subsequent Phoneme Prediction Layer and the Subsequent Pitch Prediction Layer.

As an additional application of audio mixing, the Calibrated Synthetic Voice can be further calibrated to match the Customer's Voice, as described briefly above. The Customer's Voice are captured in the form of speech segments, which may then be cut up further into distinct phonemes. Then the customer's voice can be used as the "original voice" in order to further calibrate the calibrated synthetic voice, thereby forming a "Customer Mimic Voice". This customer mimic voice may be saved along with identification data corresponding to the mimicked customer, such as the phone number, account number, name, gender, country of origin, nationality, residence, or other data. The Customer Mimic Voice may then be invoked by an Agent AI after a "confrontation" event is detected, which may consist of a detection by the Agent AI that the customer is becoming irate. The mimicked voice may also be invoked by a request made by the customer to speak to a manager, such that the "manager", as manifested by the Agent AI, uses the Customer Mimic Voice.

A particular Customer Mimic Voice may also be used if the system knows beforehand the gender, nationality, and/or residence of a customer prior to conversing. Thus, the Agent AI may employ a Customer Mimic Voice that is parameterized by a matching gender, nationality, and/or residence when speaking with the new customer in order to provide an experience of increased familiarity with the customer. The Agent AI may even identify itself by a name common to the gender, nationality, and/or residence parameterized by the Customer Mimic Voice.

SSML Tags

SSML (Speech Synthesizing Markup Language) tags are customization instructions applied to various points in text, including the points between words. These instructions are used when converting text to speech so that effects like breathing, or pauses may be integrated into the audio. Novel SSML tags conceived herein include an audio track of "typing on a keyboard", humming, clicking the tongue, laughter or chuckling, or the snapping of figures. Additional SSML tags are modifications to the phonemes scheduled or predicted by the system, such as the slowing down of a phoneme, the unusual increase of its pitch, or a repetition thereof resulting in a "stutter" effect. These effects are particularly useful in redirecting a conversation back to the script.

SSML tags may also be assigned randomly throughout a conversation in order to disrupt what would otherwise be a methodical and consistent flow. Such disruptions create the illusion of attentional error common in natural language. Disruptions identified by the SSML tags may include an abrupt halting of speech mid-sentence or even mid-word, the repeating of phonemes, as mentioned, as well as the repeating of entire words, phrases, or sentences, with modifications performed on the phonemes, words, phrases, or sentences, such as changes of pitch and tempo.

Disruptions may also be grouped together in the form of "Parent" SSML tags which refer to multiple SSML tags, such that the application of a parent SSML tag triggers a set of corresponding SSML tags to be executed. For example, the following SSML tags may be executed in quick succession: the repetition of a phoneme at the beginning or in the middle of a word, a chuckle, and then the repetition of the whole word in its entirety.

The invention claimed is:

1. A method of generating a synthetic voice, comprising the steps of:
   a. capturing audio data and saving the audio data as a set of speech segments;
   b. converting the set of speech segments into a common audio format;
   c. cutting the speech segments into speech segments of uniform length;
   d. grouping the speech segments such that the speech segments within each group of speech segments are derived from a common speaker;
   e. identifying phonemes within each speech segment using a phoneme processor;
   f. clipping each speech segment to isolate the separate phonemes within each speech segment, thereby forming phoneme segments;
   g. grouping the phoneme segments such that each group of phoneme segments have a common phoneme type;
   h. identifying pitch types within each group of phoneme segments using a pitch processor, with pitch types including high, medium, and low pitches;
   i. grouping the phoneme segments such that each group of phoneme segments have a common phoneme-pitch type, thereby forming phoneme-pitch groups;
   j. converting the phoneme segments into spectral Mel-Scale data segments using a Mel-Spectrogram to form a first set of spectral segments;
   k. performing SPL analysis on each spectral segment in the first set of spectral segments to generate a first set of SPL tracks, with each SPL track of the first set of SPL tracks corresponding to a given spectral segment and identifying sound pressure, tone, and pause attributes of the given spectral segment;
   l. Grouping the first set of spectral segments such that every spectral segment within a group of spectral segments has common sound pressure, tone, and pause attributes;
   m. inputting the first set of spectral segments and the first set of SPL tracks into a first neural vocoder;
   n. comparing sound pressure, tone, pause, and phoneme attributes of the first set of spectral segments to standard sound pressure, tone, pause, and phoneme attribute ranges, with the standard attribute ranges selected for comparison determined by the phoneme-pitch group and the SPL tracks;
   o. culling spectral segments with attributes that fall outside standard attribute ranges from the first set of spectral segments;
   p. merging remaining spectral segments within each group of common phoneme-pitch type into a merged segment, with the merged segments being a second set of spectral segments;
   q. performing SPL analysis on each merged segment to generate SPL tracks for the merged segments, with the SPL tracks generated for the merged segments being a second set of SPL tracks;
   r. iteratively inputting the second set of spectral segments and the second set of SPL tracks into the first neural vocoder into a first stream of the first neural vocoder and inputting the first set of spectral segments and the first set of SPL tracks into a second stream of the first neural vocoder;
   s. during each iteration, comparing the first set of spectral segments to the second set of spectral segments, and then replacing spectral segments from the second set of spectral segments that are determined to have sound properties inferior to corresponding spectral segments from the first set of spectral segments with the corresponding spectral segments from the first set of spectral segments;
   t. providing a second neural vocoder configured to predict subsequent phonemes, with the second neural vocoder comprising a plurality of layers including a first phoneme layer, a second phoneme layer, a phoneme weight layer, a first pitch layer, a second pitch layer, and a pitch weight layer;
      i. with the first and second phoneme layers each comprising sets of nodes associated with distinct phonemes;
      ii. with the first and second pitch layers each comprising sets of nodes associated with distinct pitches;
      iii. with the phoneme weight layer comprising a first set of weight nodes, with each weight node of the first set of weight nodes associated with a likelihood that a node from the first phoneme layer will be succeeded by a node from the second phoneme layer;
      iv. with the pitch weight layer comprising a second set of pitch weight nodes, with each weight node of the second set of pitch weight nodes associated with a likelihood that a node from the first pitch layer will be succeeded by a node from the second pitch layer;
      v. with the second neural vocoder trained on a set of whole speech segments, with each whole speech segment of the whole speech segments having multiple phonemes.

2. A method of generating a synthetic voice, comprising the steps of:
   a. capturing a set of speech segments;
   b. identifying phonemes within each speech segment using a phoneme processor, then clipping each speech segment to isolate the separate phonemes within each speech segment, thereby forming phoneme segments, and then grouping the phoneme segments such that each group of phoneme segments have a common phoneme type;
   c. identifying pitch types within each group of phoneme segments using a pitch processor, and then grouping the phoneme segments such that each phoneme segment within a group of phoneme segments has a common phoneme-pitch type, thereby forming phoneme-pitch groups;

d. converting the phoneme segments into a first set of spectral segments using a Mel-Spectrogram;

e. performing SPL analysis on each spectral segment in the first set of spectral segments to generate a first set of SPL tracks, with each SPL track of the first set of SPL tracks corresponding to a given spectral segment and identifying sound pressure, tone, and pause attributes of the given spectral segment;

f. grouping the first set of spectral segments such that every spectral segment within a group of spectral segments has common sound attributes;

g. inputting the first set of spectral segments and the first set of SPL tracks into a first neural vocoder;

h. comparing sound attributes of the first set of spectral segments to standard sound attribute ranges, with the standard sound attribute ranges selected for comparison determined by the phoneme-pitch group and the SPL tracks;

i. culling spectral segments with attributes that fall outside standard attribute ranges from the first set of spectral segments;

j. merging remaining spectral segments within each group of common phoneme-pitch type into a merged segment, with the merged segments being a second set of spectral segments.

3. The method of claim 2, additionally comprising the steps of: converting the set of speech segments into a common audio format and cutting the speech segments into speech segments of uniform length prior to identifying phonemes within each speech segment.

4. The method of claim 2, additionally comprising the step of: grouping the speech segments such that the speech segments within each group of speech segments are derived from a common speaker.

5. The method of claim 2, with pitch types including high, medium, and low pitches.

6. The method of claim 2, with common sound attributes including common sound pressure, tone, and pause attributes.

7. The method of claim 2, additionally comprising the step of:
a. performing SPL analysis on each merged segment to generate SPL tracks for the merged segments, with the SPL tracks generated for the merged segments being a second set of SPL tracks;
b. iteratively inputting the second set of spectral segments and the second set of SPL tracks into a first stream of the neural vocoder and inputting the first set of spectral segments and the first set of SPL tracks into a second stream of the first neural vocoder;
c. during each iteration, comparing the first set of spectral segments to the second set of spectral segments, and then replacing spectral segments from the second set of spectral segments that are determined to have sound properties inferior to corresponding spectral segments from the first set of spectral segments with the corresponding spectral segments from the first set of spectral segments.

8. The method of claim 2, additionally comprising the steps of:
a. providing a second neural vocoder configured to predict subsequent phonemes, with the second neural vocoder comprising a plurality of layers including a first phoneme pitch layer, a second phoneme pitch layer, and a phoneme pitch weight layer;
   i. with the first and second phoneme pitch layers each comprising sets of nodes associated with distinct phonemes and pitches;
   ii. with the phoneme pitch weight layer comprising a set of weight nodes, with each weight node of the set of weight nodes associated with a likelihood that a node from the first phoneme pitch layer will be succeeded by a node from the second phoneme pitch layer;
   iii. with the second neural vocoder trained on a set of whole speech segments, with each whole speech segment of the whole speech segments having multiple phonemes.

9. The method of claim 2, additionally comprising the steps of:
a. providing a second neural vocoder configured to predict subsequent phonemes, with the second neural vocoder comprising a plurality of layers including a first phoneme layer, a second phoneme layer, and a phoneme weight layer;
   i. with the first and second phoneme layers each comprising sets of nodes associated with distinct phonemes;
   ii. with the phoneme weight layer comprising a first set of weight nodes, with each weight node of the first set of weight nodes associated with a likelihood that a node from the first phoneme layer will be succeeded by a node from the second phoneme layer;
   iii. with the second neural vocoder trained on a set of whole speech segments, with each whole speech segment of the whole speech segments having multiple phonemes.

10. The method of claim 9,
a. with the second neural vocoder additionally comprising a first pitch layer, a second pitch layer, and a pitch weight layer,
b. with the first and second pitch layers each comprising sets of nodes associated with distinct pitches;
c. with the pitch weight layer comprising a second set of pitch weight nodes, with each weight node of the second set of pitch weight nodes associated with a likelihood that a node from the first pitch layer will be succeeded by a node from the second pitch layer.

11. A method of generating a synthetic voice, comprising the steps of:
a. capturing a set of speech segments;
b. then identifying pitches and phonemes within each speech segment using a phoneme processor and a pitch processor, then clipping each speech segment to isolate the separate pitches and phonemes within each speech segment, thereby forming phoneme pitch segments;
c. then converting the speech segments or phoneme pitch segments into a first set of spectral segments using a Mel-Spectrogram;
d. then inputting the first set of spectral segments into a first neural vocoder, then comparing sound attributes of the first set of spectral segments to standard sound attribute ranges using the first neural vocoder;
e. then culling spectral segments with attributes that fall outside standard attribute ranges from the first set of spectral segments;
f. then merging remaining spectral segments having a common pitch type and phoneme type into a merged segment, with the merged segments being a second set of spectral segments.

12. The method of claim 11, comprising the additional step of: grouping the phoneme pitch segments such that each phoneme pitch segment within a group of phoneme pitch segments has a common phoneme type and pitch type.

13. The method of claim 11, comprising the additional step of: grouping the first set of spectral segments such that every spectral segment within a group of spectral segments has common sound attributes.

14. The method of claim 11, with the standard sound attribute ranges selected for comparison determined by phoneme type and pitch type of the phoneme pitch segment.

15. The method of claim 11, additionally comprising the step of:
   a. providing a second neural vocoder configured to predict subsequent phonemes, with the second neural vocoder comprising a plurality of layers including a first phoneme pitch layer, a second phoneme pitch layer, and a phoneme pitch weight layer;
      i. with the first and second phoneme pitch layers each comprising sets of nodes associated with distinct phonemes and pitches;
      ii. with the phoneme pitch weight layer comprising a set of weight nodes, with each weight node of the set of weight nodes associated with a likelihood that a node from the first phoneme pitch layer will be succeeded by a node from the second phoneme pitch layer.

16. The method of claim 11, additionally comprising the step of:
   a. providing a second neural vocoder configured to predict subsequent phonemes, with the second neural vocoder comprising a plurality of layers including a first phoneme layer, a second phoneme layer, and a phoneme weight layer;
      i. with the first and second phoneme layers each comprising sets of nodes associated with distinct phonemes;
      ii. with the phoneme weight layer comprising a first set of weight nodes, with each weight node of the first set of weight nodes associated with a likelihood that a node from the first phoneme layer will be succeeded by a node from the second phoneme layer;
      iii. with the second neural vocoder trained on a set of whole speech segments, with each whole speech segment of the whole speech segments having multiple phonemes.

17. The method of claim 16, with the second neural vocoder additionally comprising a first pitch layer, a second pitch layer, and a pitch weight layer;
   a. with the first and second pitch layers each comprising sets of nodes associated with distinct pitches;
   b. with the pitch weight layer comprising a second set of pitch weight nodes, with each weight node of the second set of pitch weight nodes associated with a likelihood that a node from the first pitch layer will be succeeded by a node from the second pitch layer.

18. The method of claim 11, comprising the additional steps of:
   a. performing SPL analysis on each spectral segment in the first set of spectral segments to generate a first set of SPL tracks, with each SPL track of the first set of SPL tracks corresponding to a given spectral segment and identifying sound pressure, tone, and pause attributes of the given spectral segment;
   b. then grouping the first set of spectral segments such that every spectral segment within a group of spectral segments has common sound attributes, with common sound attributes including common sound pressure, tone, and pause attributes.

19. The method of claim 18, additionally comprising the step of:
   a. performing SPL analysis on each merged segment to generate SPL tracks for the merged segments, with the SPL tracks generated for the merged segments being a second set of SPL tracks;
   b. then iteratively inputting the second set of spectral segments and the second set of SPL tracks into the first neural vocoder into a first stream of the first neural vocoder and inputting the first set of spectral segments and the first set of SPL tracks into a second stream of the first neural vocoder;
   c. then during each iteration, comparing the first set of spectral segments to the second set of spectral segments, and then replacing spectral segments from the second set of spectral segments that are determined to have sound properties inferior to corresponding spectral segments from the first set of spectral segments with the corresponding spectral segments from the first set of spectral segments.

20. The method of claim 11, comprising the additional steps of:
   a. iteratively inputting the second set of spectral into a first stream of the first neural vocoder and inputting the first set of spectral into a second stream of the first neural vocoder;
   b. then during each iteration, comparing the first set of spectral segments to the second set of spectral segments, and then replacing spectral segments from the second set of spectral segments that are determined to have sound properties inferior to corresponding spectral segments from the first set of spectral segments with the corresponding spectral segments from the first set of spectral segments.

* * * * *

UNITED STATES PATENT AND TRADEMARK OFFICE
CERTIFICATE OF CORRECTION

PATENT NO. : 11,935,515 B2
APPLICATION NO. : 17/563008
DATED : March 19, 2024
INVENTOR(S) : Claude Polonov Page 1 of 1

It is certified that error appears in the above-identified patent and that said Letters Patent is hereby corrected as shown below:

On the Title Page

Item (71): Applicant change "Meca Holdings IP LLC" to --MecaTechnologies IP Holdings LLC--

Signed and Sealed this
Second Day of September, 2025

Coke Morgan Stewart
*Acting Director of the United States Patent and Trademark Office*